Dec. 19, 1922.                                                    1,439,197.
J. H. SMITH, Jr.
METHOD AND APPARATUS FOR MAKING VEHICLE WHEEL TIRES.
FILED SEPT. 3, 1920.                              2 SHEETS—SHEET 1.
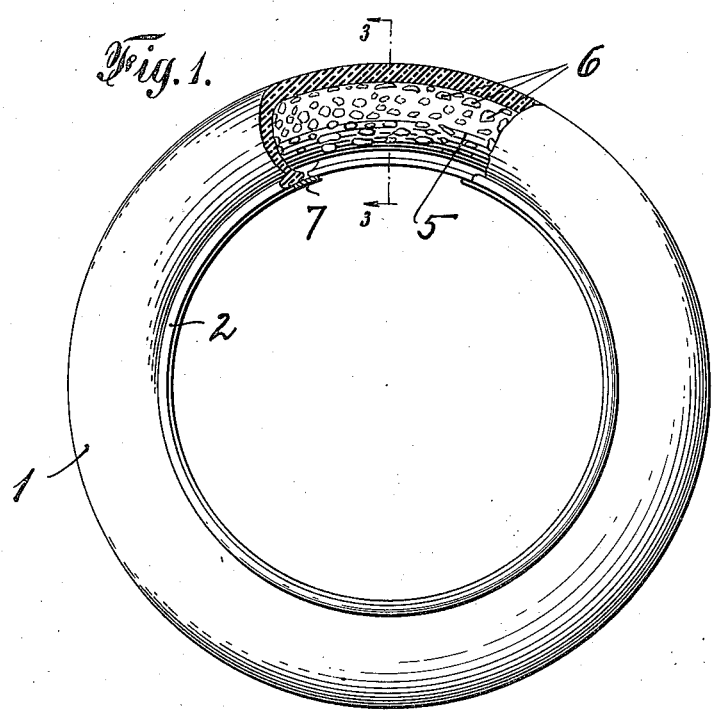
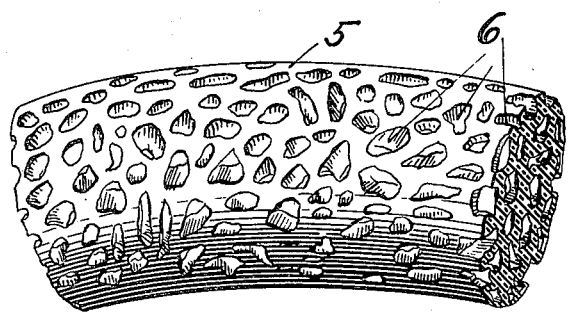
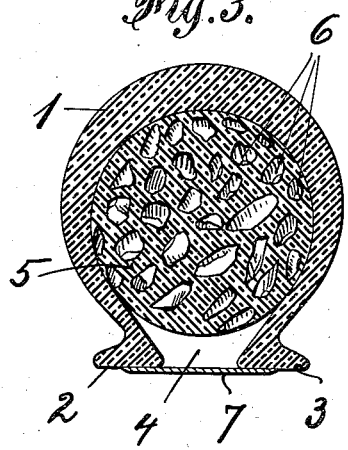

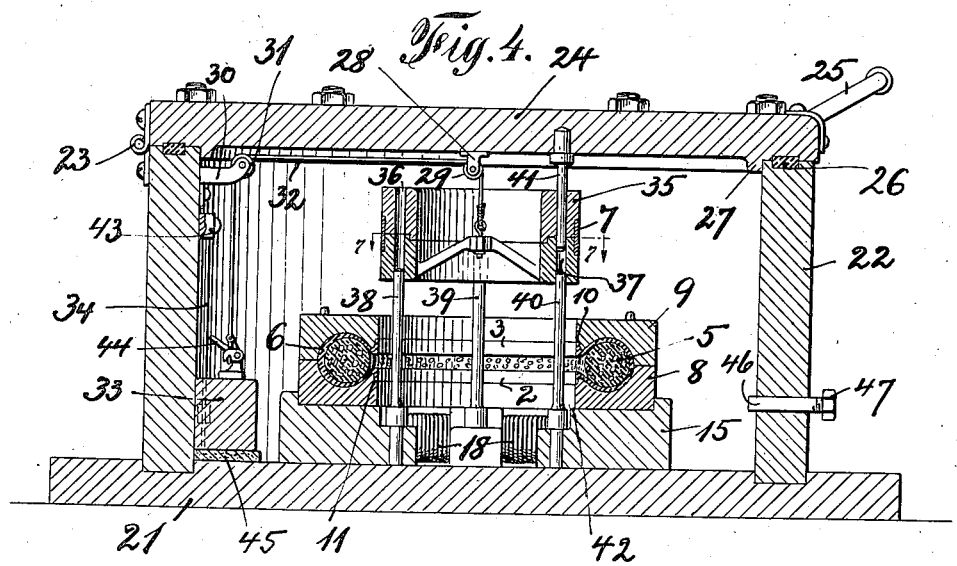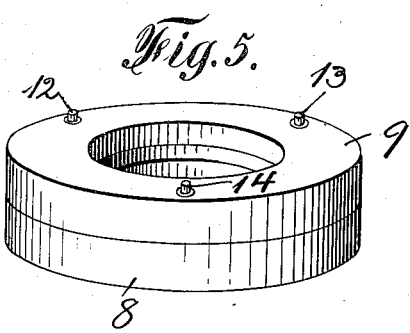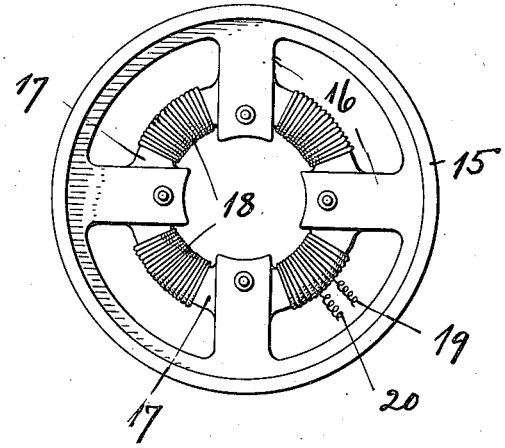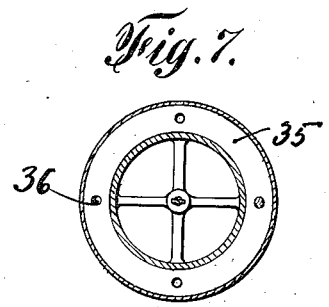

Patented Dec. 19, 1922.

1,439,197

UNITED STATES PATENT OFFICE.

JAMES H. SMITH, JR., OF PASSAIC, NEW JERSEY.

METHOD AND APPARATUS FOR MAKING VEHICLE WHEEL TIRES.

Application filed September 3, 1920. Serial No. 407,992.

*To all whom it may concern:*

Be it known that I, JAMES H. SMITH, Jr., a citizen of the United States, residing at Passaic, in the county of Passaic and State of New Jersey, have invented certain new and useful Improvements in Methods and Apparatus for Making Vehicle Wheel Tires, of which the following is a specification, reference being had therein to the accompanying drawing.

My invention relates to tires for vehicle wheels and more especially for the wheels of automobiles. The drawbacks of the ordinary pneumatic tire are so well known that it is unnecessary to point them out. Equally well known are the shortcomings of the resilient spring tires, of which there is a large variety, none of which however has been able to replace the pneumatic tire. The tire according to my present invention is so constructed that it practically entirely possesses the soft cushioning effect of a pneumatic tire without however being subject to its drawbacks, the principal of which is the puncture. The tire according to my invention comprises the ordinary tire-shoe of any desired shape and make-up, and embedded therein an annular cylindrical body of yielding material such as rubber, which body contains innumerable small holes or cells. These cells, after the cylindrical body has been placed into the tire-shoe are filled with air under high pressure, whereupon the open inner periphery of the tire-shoe is closed by a band of rubber. In order to accomplish this, the tire-shoe enclosing the cylindrical body is placed into a sectional mould which is open corresponding to the open inner periphery of the shoe to permit the air under pressure to be introduced into the cells of the said cylindrical body. The filling of the cells with air under pressure is effected in a closed casing having strong walls to resist the pressure. As soon as the desired pressure has been obtained, then a complementary part, exactly fitting the inner smooth surface of the central opening of the mold and carrying the circular band of rubber to close the open inner periphery of the tire-shoe is then moved into position so that the said circular band comes to lie across the open inner circumference of the tire-shoe. While in this position, in which the escape of air from the cells of the cylindrical body embedded in the tire is prevented, the tire-shoe, cylindrical body and the circular rubber band are vulcanized, whereby the open inner circumference of the tire-shoe is permanently closed.

For a better understanding, I refer to the drawing in which I have shown the new tire and a method of making the same. In the drawing Fig. 1 shows the new tire with a portion of tire-shoe broken away to show the annular cylindrical body therein;

Fig. 2 shows a fragment of the annular cylindrical body;

Fig. 3 is a cross-section through the tire along 3—3 in Fig. 1;

Fig. 4 is a sectional view of the casing adapted to receive the sectional mold containing the tire-shoe and cylindrical body;

Fig. 5 is an elevation of the sectional mold;

Fig. 6 shows the mold-support carrying windings for magnetizing it;

Fig. 7 is a bottom view of the center part or head carrying the cylindrical band.

As seen from Figs. 1 to 3, the new tire comprises the tire-shoe 1 of any desired make and provided with the rim flanges 2, 3, between which is left the peripheral gap 4. In this tire-shoe is placed in lieu of the usual tube an annular cylindrical body 5, of rubber or any other suitable yielding material, which fills out the inner space of the shoe. This cylindrical body contains innumerable small holes or cells 6 separated from each other by the material of the body. All these cells are filled with air, under pressure so as to give the entire cylindrical body a high cushioning effect similar to that of the ordinary inflated tire-tube used in pneumatic tires. The peripheral gap 4 of the tire-shoe is closed by a circular rubber band 7 which after the inflation with air is placed against the flanges 2, 3 and is secured thereto by vulcanization to prevent the air contained in the cells 6 from escaping.

In Figs. 4, 5 and 6 is illustrated one method of making such a tire.

The tire-shoe 1 with the annular cylindrical body 5 embedded therein is placed into a strong mold composed of a lower section 8 and an upper section 9. These sections are so shaped as to snugly receive the tire-shoe, the flanges 2, 3 of which are received in recesses 10, 11 provided in the inner peripheral faces of the sections (Fig.

4). The two sections of the mold are then fastened together by bolts 12, 13, 14, the contacting faces of the mold-sections being finished off smoothly so that the sections close together airtight, except for the inner peripheral opening which accommodates the flanges 2 and 3 of the tire-shoe. The closed mold containing the tire-shoe 1 having embedded therein the annular cylindrical body 5 is positioned on a supporting block 15 (Fig. 4) provided with arms 16 (Fig. 6) connected by ring-shaped portions 17 which carry continuous windings 18 terminating at 19, 20 in leaders, whereby they may be connected with any source of electricity (not shown) so that as a current is passed through the windings 18, the supporting block 15 becomes strongly magnetic, the purpose of which will presently appear.

The supporting block 15 adapted to receive the closed mold is in turn supported by the base-plate 21 of a cylindrical casing 22 having a very strong wall to resist high pressure of air. Hinged to the casing at 23 is a strong lid 24 provided with a handle 25. This lid when down, closes the casing 22 air-tight. As will be seen from Fig. 4, a packing ring 26 is provided, and near its rim, the lid has an inwardly projecting annular flange 27, which, when the lid is down, bears in air-tight contact against the inner wall of the casing 22. Any convenient means may be employed to lock the lid in position on the casing, none being shown in the drawing. To the underside of the lid 24 is secured a small bearing 28 for a small roller 29. In a bracket 30 projecting from the inner wall of the casing is journalled a second roller 31. Over these two rollers passes a thin cable 32, from one end of which is suspended a weight 33, guided on a rod 34, and from whose other end is suspended an annular head 35, made of two sections fitted one into the other and presenting a smooth external wide circular face which, when the head 35 is lowered into the central opening of the mold, makes air-tight contact with the smooth inner circular face of the mold. The head 35 is provided with three or more bores, two of which are shown at 36 and 37 in Fig. 4 which bores are in line with guide rods 38, 39, 40, whereby the head 35 is guided on its descent into the central opening of the mold. As will be understood from the further description, it is very important, that the head fits exactly into the said central opening. The guide-rods are fastened in the supporting block 15, as shown. A third short guide-rod 41 is fastened to the inner face of the lid 24 depending therefrom and extending into bore 37 so that upon the lowering of the lid the head 35 is sure to assume its proper position to enable the guide-rods 38, 39, 40 to enter the bores in the said head.

In the outer smooth cylindrical surface of the head 35 is cut a recess which receives the circular rubber band 7 used to close the inner peripheral gap between the flanges 2, 3 of the tire shoe. To enable the said rubber band to be easily inserted into the said recess, the head 35 is, as has already been mentioned above, made in two sections corresponding to the two sections of the mold. When the lid 24 has been lowered into the position shown in Fig. 4 and properly fastened to the casing, the head 35 is suspended as shown in Fig. 4, being balanced in this position by the weight 33. The sections of the head 35 are made of a magnetic metal, preferably iron. Therefore when an electric current is passed through the coils 18 of the supporting block 15, a magnetic force is generated in said block which attracts the head 35 exerting thereon a downward pull overcoming the pull of the weight 33 until the head is entirely seated within the central opening of the mold. Before, however, the electric current is turned on, air under great pressure of say fifty lbs. per square inch is admitted into the casing filling the many cells in the annular cylindrical body 5 embedded in the tire-shoe enclosed in the mold. Then before the supply of air under pressure is shut off, the electric current is turned on, causing by the magnetizing of the supporting block 15 the pulling down of the head 35 as stated above. As the latter has an air-tight fit in the central opening of the mold, the supply of air under pressure can now be cut off, because the air cannot escape from the cells of the cylindrical body 5, the circular band 7 lying across the open gap between the flanges 2, 3 of the tire-shoe. As, by the magnetic force created in the supporting block 15 the head 35 is being pulled down into the central opening of the mold, until it rests with its lower end on the narrow circular shelf 42 of the supporting block, the weight 33 has been raised by the connecting cable 32, until it abuts against a lug 43, whereby a latch 44 holding the weight to the cable becomes automatically unlatched releasing the weight which then drops down; the fall of the weight is received by a cushion 45. This release of the weight is necessary to enable the lid 24 to be raised, while the head 35 is in position in the central opening of the mold. In this position of the head 35, vulcanization of the tire-shoe is now effected in any well-known manner so that the annular cylindrical body 5 will adhere to the inner wall of the tire-shoe, while the circular band 7 will become one with the flanges 2, 3 of the tire-shoe; the latter is thus completely closed, no air being permitted to escape from the cells of the cylindrical body 5 embedded in the tire-shoe. Then, the upper section of the mold is released from the lower section, and likewise, the upper section of head 35 is separated from its lower section. The complete tire is now ready to be lifted out of the two lower sections. At 46 a short pipe passing through the wall of the casing 1 and provided with an air-tight pipe-coupling 47 is shown, which pipe may be connected with any source of air under pressure, an air-pump, for instance, to admit air under pressure into the casing.

It is evident that the details of the construction as shown can be departed from without departure from the spirit and scope of the invention.

I claim:

1. Method of making a vehicle tire which consists in placing an annular elastic body having a large number of cells into an outer tire-shoe, filling the cells in the said body with air under high pressure, closing the inner peripheral gap of the tire-shoe, and vulcanizing the whole.

2. Device for making a vehicle tire in accordance with the method as set forth in claim 1, comprising a sectional mold for receiving the tire-shoe together with the annular body embedded in said tire-shoe, a casing for receiving the mold and adapted to be closed air-tight, a complementary part carrying the means for closing the inner peripheral gap of the tire-shoe and adapted to fit air-tight in the central opening of said mold, means for holding said complementary part suspended over the central opening of said mold, means for moving said complementary part into position within the central opening of the said mold and means for admitting air under pressure into said casing, while the said complementary part is suspended over the central opening of said mold.

3. Device as in claim 2, in which the complementary part comprises a head, made of two sections corresponding to the sections of the mold and fitted together in an air-tight manner, and provided with a recess for receiving the means for closing the inner peripheral gap of the tire-shoe.

4. Device as in claim 2, including means for guiding the head during its descent into the central opening of the mold.

5. Device as in claim 2 comprising a supporting block for the said mold, wire coils carried by said supporting block for creating therein a magnetic force when subjected to the passage of an electric current, the said magnetic force constituting the means for moving the said complementary part into position within the central opening of the said mold.

6. Device as set forth in claim 2, in which the means for holding the said complementary part suspended over the central opening of the said mold consists of a counter-weight including a cable connecting said counter-weight with said complementary part, and guide-rolls for said cable.

7. Device as set forth in claim 6, including a latch for holding the said counter-weight to the one end of the said cable, and an abutment in the path of said latch so as to automatically release the said counter-weight when the said complementary part has been moved into its operative position.

In testimony whereof I hereunto affix my signature.

JAMES H. SMITH, Jr.